United States Patent [19]

Nicely

[11] Patent Number: 4,637,323
[45] Date of Patent: Jan. 20, 1987

[54] CORNER STRUCTURE FOR ADJUSTABLE SHELVING (WITH OPPOSED CLAMPING MEMBERS)

[75] Inventor: Charles W. Nicely, Dallas Township, Luzerne County, Pa.

[73] Assignee: United Steel & Wire Company, Battle Creek, Mich.

[21] Appl. No.: 625,943

[22] Filed: Jun. 29, 1984

[51] Int. Cl.$^4$ .............................................. A47B 9/08
[52] U.S. Cl. .................................... 108/107; 108/111; 108/144; 211/187; 403/235
[58] Field of Search ................. 108/111, 144, 96, 101, 108/106, 107, 151, 153, 157; 211/186, 187; 248/231.3; 403/256, 233, 235

[56] References Cited

U.S. PATENT DOCUMENTS

| | | | |
|---|---|---|---|
| 911,567 | 2/1909 | Berkowitz | 108/106 |
| 1,763,677 | 6/1930 | Scott | 248/231.3 |
| 3,173,385 | 3/1965 | Tucker | 108/106 |
| 3,424,111 | 1/1969 | Maslow . | |
| 3,523,508 | 8/1970 | Maslow | 108/144 |
| 3,604,369 | 9/1971 | Maslow | 108/144 |
| 3,664,274 | 5/1972 | Bustos | 108/144 |
| 3,675,598 | 7/1972 | Kesilman et al. | 108/144 |
| 3,757,705 | 9/1973 | Maslow | 108/144 |
| 3,874,511 | 4/1975 | Maslow | 108/144 |
| 4,053,246 | 10/1977 | Uccello | 403/233 |
| 4,079,678 | 3/1978 | Champagne | 108/144 |
| 4,128,064 | 12/1978 | Chung et al. | 108/111 |
| 4,138,953 | 2/1979 | Tashman | 108/144 |
| 4,230,052 | 10/1980 | Champagne | 108/144 |
| 4,237,798 | 12/1980 | Welsch et al. | 108/111 |
| 4,257,333 | 3/1981 | Pollack | 108/144 |
| 4,318,352 | 3/1982 | Friedman et al. | 108/111 |

FOREIGN PATENT DOCUMENTS

| | | | |
|---|---|---|---|
| 855715 | 5/1940 | France . | |
| 1047554 | 12/1953 | France . | |
| 642935 | 7/1962 | Italy | 108/111 |
| 24353 | of 1894 | United Kingdom | 403/235 |

Primary Examiner—Kenneth J. Dorner
Assistant Examiner—Mark W. Binder
Attorney, Agent, or Firm—Flynn, Thiel, Boutell & Tanis

[57] ABSTRACT

A shelving unit wherein each corner of the shelf has a platelike bracket rigidly associated therewith. A corner structure coacts between each bracket and a respective corner post, which post is preferably of tubular cross section and has dimplelike recesses formed therein at selected vertically spaced intervals. The corner structure employs a strap which surrounds the post and creates intimate clamping contact with the post over approximately one-half of the external periphery thereof. This strap also preferably has interior projections which engage the dimples on the post. The corner structure also employs a corner piece which is stationarily secured to the bracket. The corner piece includes a downwardly cantilevered wedge having a front surface for engaging the periphery of the post over approximately one-half the extent thereof. The wedge vertically slidably engages within a wedgelike slot formed between the strap and the post to effect clamping of the post between the strap and corner piece.

12 Claims, 13 Drawing Figures 4,637,323

CORNER STRUCTURE FOR ADJUSTABLE SHELVING (WITH OPPOSED CLAMPING MEMBERS)

FIELD OF THE INVENTION

This invention relates to shelving and, more specifically, to improved adjustable shelving.

BACKGROUND OF THE INVENTION

Adjustable shelving employing shelves constructed of sheet metal or wire is well known and extensively utilized in numerous environments whereby the shelving is exposed to not only a wide range of environmental conditions but is also exposed to widely varying shelf loads. Shelving of this general type, which is often referred to as knock-down shelving since it is intended to be readily assembled and disassembled, conventionally employs upright corner posts which are designed to permit horizontal shelves to be mounted thereon at selected vertical increments, which shelves and corner posts generally have a cooperating corner structure therebetween which is intended to facilitate the mounting of the shelf on the post. While many of the known shelf units have provided adequate strength and rigidity, nevertheless many of the known units have required assembly procedures which are more difficult than desired and hence have impaired the flexible utilization of the shelf unit, or have possessed structural features which have either failed to provide the desired strength and rigidity or have been unsuitable for use in restaurant and hospital environments requiring sanitary conditions.

In one fairly common type of corner structure employed by a large number of conventional shelving units, each shelf is provided with corner structures fixedly associated with each corner thereof. This corner structure involves a closed collar structure defining therein a vertical opening for accommodating a corner post. With such arrangement, all four corner posts must be slidably inserted through the collars associated with the corners of each shelf, or in the alternative the individual shelves must be positioned with the collars aligned with the posts so that the shelf can be slid downwardly along the posts into position. Once the collars and posts have been properly interfitted and positionally related, then such shelving units conventionally employ separate wedge members or threaded fasteners for fixedly securing the shelf to the post at the desired elevation. This type of structural arrangement, however, increases the complexity of the assembly and disassembly operation. Further, shelving units of this type do not permit the addition or removal of an intermediate shelf after the shelving unit has been assembled without first requiring assembly or disassembly of the other shelving units disposed either above or below the intermediate shelf. This hence greatly restricts usage of the shelving unit since changes in the configuration of the shelving unit hence require complex assembly and disassembly procedures.

Another conventional configuration for known shelving units employs a corner structure which requires the use of threaded fasteners or the like for securing the individual shelves to the corner posts. In units of this type, oftentimes the shelf itself directly connects to the corner post by threaded fasteners, or in the alternative a special corner member such as a collar or the like is fitted onto the corner post and then this corner member in turn is secured to the shelf by threaded fasteners. Assembling shelving units in this fashion is also manually difficult and inefficient due to the difficulty in properly positioning and holding all of the various pieces, while at the same time attempting to position and secure the threaded fasteners. Such units often require two persons to accomplish the assembly operation. Further, shelving of this type often fails to provide the necessary strength and rigidity required to prevent the shelving unit from experiencing sway or lean when loaded.

Another problem associated with many of the known shelving units is the complexity of the corner structure used for connecting the shelves to the corner posts. Many of the known corner structures employ either a substantial number of pieces and/or pieces of extremely complex configuration which are expensive to fabricate. Such complex corner arrangements hence not only significantly and undesirable increase the cost of the shelving unit, but also often result in complex and difficult assembly techniques.

Examples of known shelving units of this general type are illustrated by U.S. Pat. Nos. 911,567, 3,173,385, 3,424,111, 3, 523,508, 3,604,369, 3,664,274, 3,757,705, 3,874,511, 4,128,064, 4,138,953, 4,237,798 and 4,257,333.

Accordingly, it is an object of this invention to provide an improved adjustable shelving unit, specifically a metal shelving unit, having an improved corner structure coacting between the shelves and the corner posts.

More specifically, this invention relates to an improved shelving unit having a corner structure which facilitates both assembly and disassembly of the shelves with respect to the corner posts, which provides a wedging relationship so as to provide for a secure and rigid shelving unit when assembled, which provides increased flexibility with respect to modification of the shelving unit by permitting removal of an intermediate shelf without requiring disassembly of the complete unit, and which provides minimal cracks or crevices so as to permit utilization of the unit in environments requiring sanitary conditions.

Another object of the invention is to provide an improved shelving unit, as aforesaid, which permits assembly due to a wedging cooperation between two clamping members associated with the corner structure, whereby the assembly and disassembly does not require insertion or removal of threaded fasteners, whereupon the shelving unit can be easily and efficiently assembled by a single person.

Still another object of the invention is to provide an improved shelving unit, as aforesaid, which employs a corner structure formed by two basic cooperating clamping members having a wedge relationship therebetween, one of the members being fixedly or removably attached to the shelf and the other being disposed so as to surround the corner post, which two members wedgingly cooperate so as to also result in the corner post being clampingly held between the two members to permit a simple but rigid and strong securement of the corner structure to the post.

In a preferred embodiment of the improved shelving unit of this invention, each shelf is preferably of a planar matlike structure formed from a plurality of substantially parallel wires which extend between and are rigidly secured to supporting trusses which extend along the edges of the shelf. Each corner of the shelf has a platelike bracket rigidly associated therewith. A corner structure coacts between each bracket and a respective corner post, which post is preferably of a tubular cross section and has dimplelike recesses formed therein at selected vertically spaced intervals. The corner structure employs a strap which surrounds the post and creates intimate clamping contact with the post over approximately one-half of the external periphery thereof. This strap also preferably has interior projections which engage the dimples on the post. The corner structure also employs a corner piece which is stationarily secured to the bracket on the shelf. The corner piece includes a downwardly cantilevered wedge portion which has a front surface adapted for engaging the periphery of the post over approximately one-half the extent thereof. The cantilevered wedge portion vertically slidably wedgingly engages within a wedgelike slot formed between the strap and the post to effect clamping of the post between the strap and corner piece.

Other objects and purposes of the improved structure according to this invention will be apparent to persons familiar with structures of this general type upon reading the following specification and inspecting the accompanying drawings.

Figure 1:
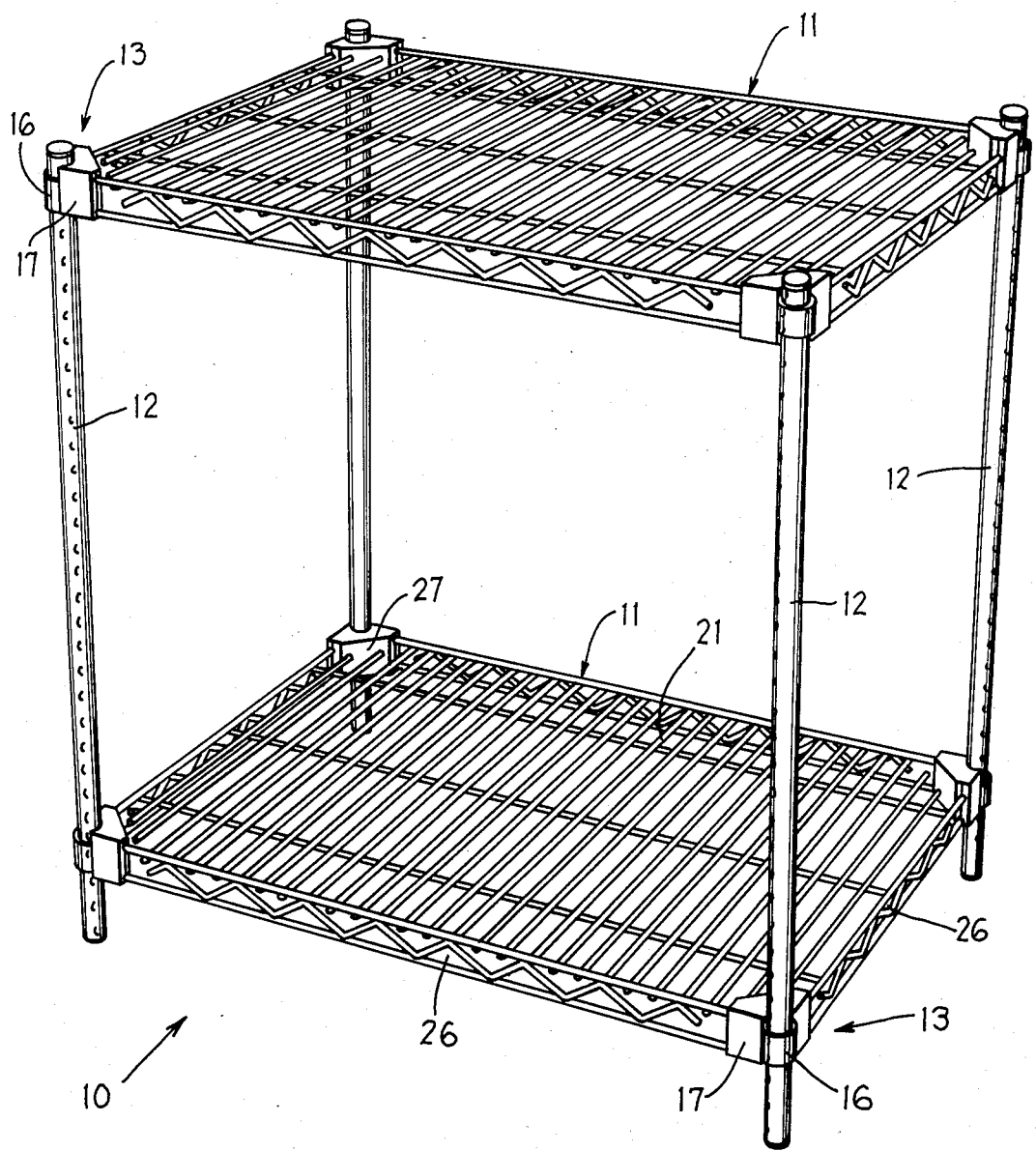
FIG. 1 is a fragmentary perspective view illustrating the shelving unit of this invention in an assembled condition.
Figure 2:
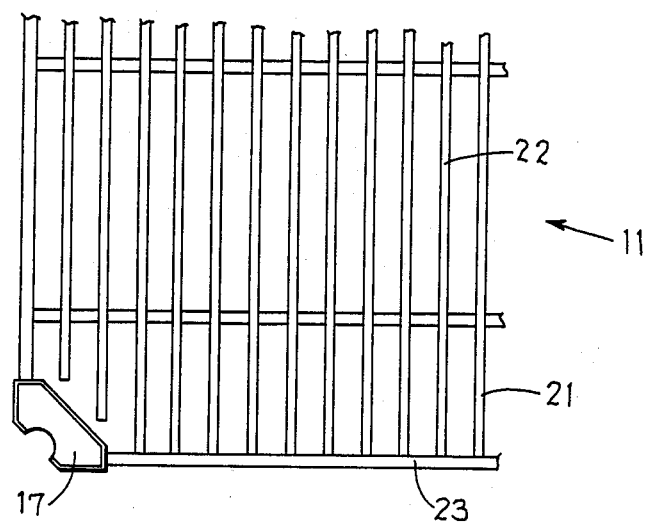
FIG. 2 is a top view showing a portion of the shelf.
Figure 3:
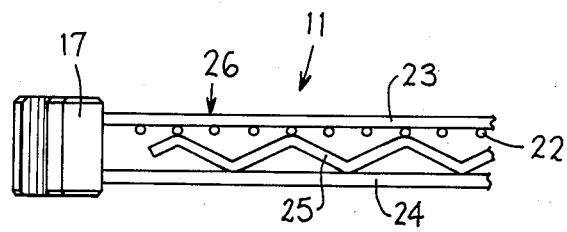
FIG. 3 is a front view showing the shelf illustrated by FIG. 2.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the shelving unit and designated parts thereof. Said terminology will include the words specifically mentioned, derivatives thereof, and words of similar import.

DETAILED DESCRIPTION

Referring to FIG. 1, there is illustrated an adjustable, knock-down shelving unit 10 according to the present invention. This shelving unit includes a plurality of substantially horizontal shelves 11 which are disposed in parallel but vertically spaced relationship, which shelves are supported by a plurality, here four, of upright corner posts 12. The corner of each shelf 11 is releasably attached to the respective corner post 12 by means of a separable corner structure 13.

The corner structure 13 of this invention is basically of a two-piece construction, and includes a first clamping member 16 which shall hereinafter be referred to as the strap, and a second clamping member 17 which shall hereinafter be referred to as the corner piece.

The construction of the shelf 11 is generally conventional in that it includes a substantially planar mat 21 formed from a plurality of parallel metal wires or rods 22 which are disposed in sidewardly spaced relationship and extend transversely across the width of the shelf. The mat wires 22 are fixedly secured to and supported on upper longitudinally extending wires or rods 23, which longitudinal rods 23 are disposed adjacent the front and rear edges of the shelf. A further wire 23 is also normally positioned to extend longitudinally under the center of the shelf to provide additional strength and reinforcement. Upper wire 23 and a parallel lower longitudinal wire 24 are rigidly secured together by means of a welded truss wire 25 extending therebetween so as to define a truss 26 which extends longitudinally along both the front and rear edges of the shelf. Similar such trusses are also fixedly secured to and extend along the side edges of the shelf. If necessary, a similar truss can also extend longitudinally along the longitudinal center line of the shelf.

Figure 4:
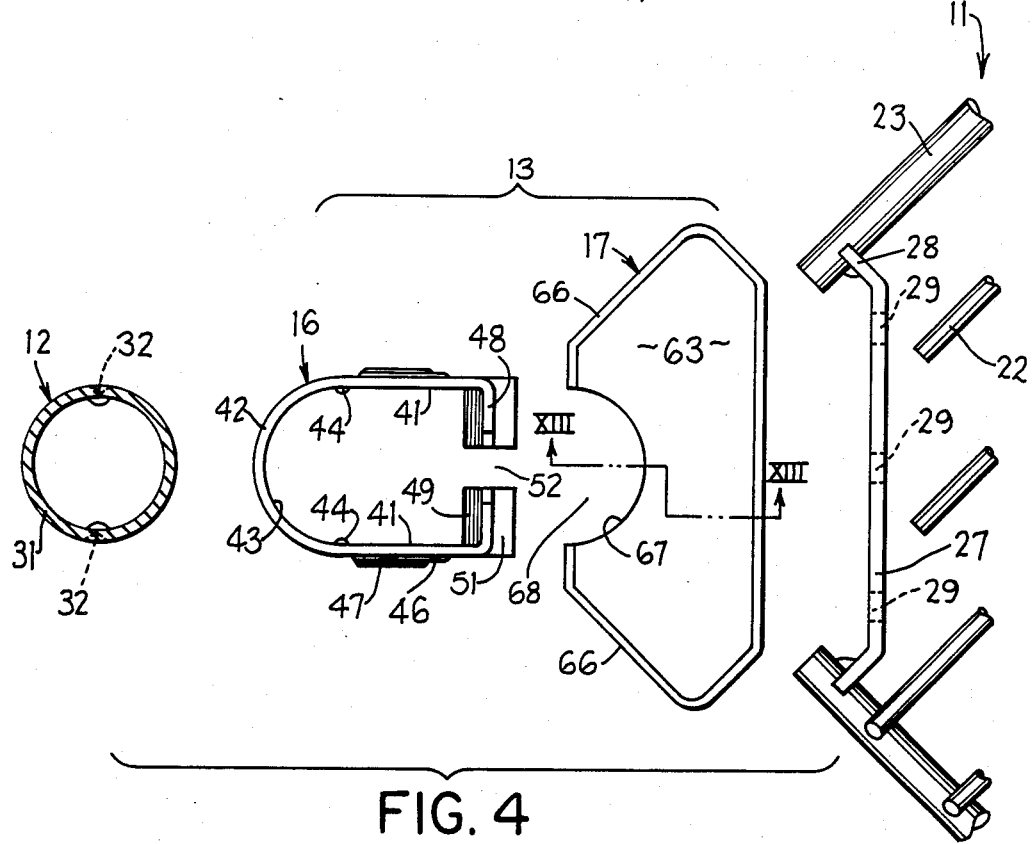
FIG. 4 is an exploded top view showing the positional relationship of the corner structure between the post and the corner of the shelf.
Figure 5:
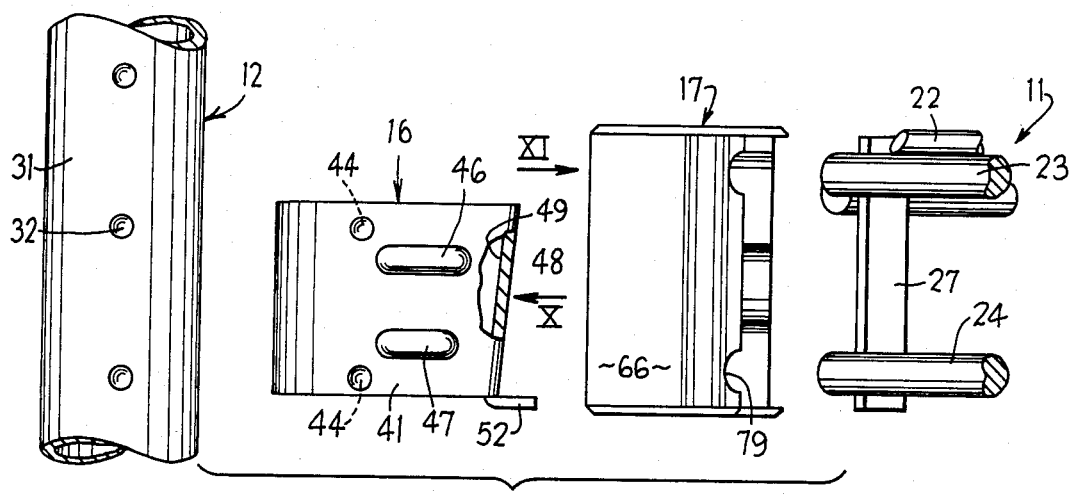
FIG. 5 is an elevational view corresponding to FIG. 4.
Figure 6:
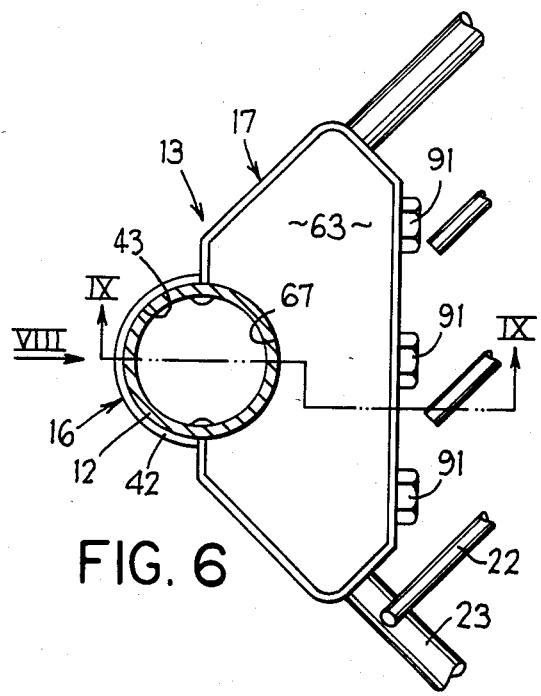
FIG. 6 is a top view illustrating the corner structure assembled between the shelf and post.
Figure 7:
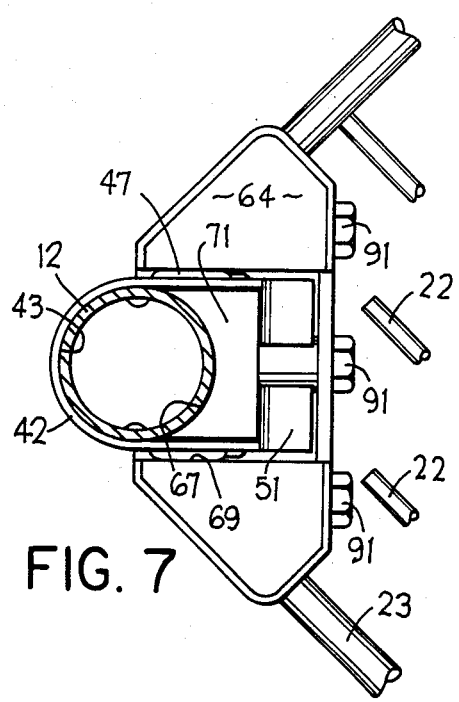
FIG. 7 is a bottom view illustrating the corner structure assembled between the shelf and post.
Figure 13:
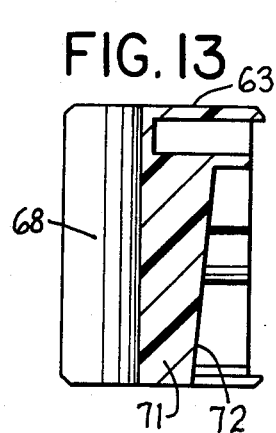
FIG. 13 is a sectional view of a corner piece as taken substantially along line XIII—XIII in FIG. 4.

Each shelf 11 is provided with a corner bracket 27 (FIG. 4) fixed thereto. This bracket 27 is formed substantially as a flat metal plate which has the end portions 28 thereof bent substantially at a 45° angle from the primary planar center portion of the plate, whereby the end portions 28 perpendicularly intersect the truss wires 23 and 24. The edges of these end portions 28 have suitable openings or notches formed therein so as to accommodate the truss wires 23 and 24. The corner bracket plate 27 is fixedly secured to the trusses, such as by being welded to the truss wires 23 and 24. These truss wires 23 and 24 have the free ends thereof disposed so as to project a small distance outwardly past the corner bracket plate 27. The main planar portion of this bracket plate 27 also has a plurality, here three, of openings or holes 29 extending therethrough, which holes 29 are horizontally spaced apart substantially along the horizontal central plane of the corner bracket.

Considering now the post 12, same comprises a vertically elongated channel, preferably a closed channel such as a tube. The post preferably has a cylindrical tubular cross section to provide optimum strength and ease of usability and assembly. The post, conventionally of steel, is preferably provided with two rows of indentations or recesses 32, hereinafter referred to as dimples, formed therein, which rows of dimples 32 extend longitudinally of the post and are disposed on diametrically opposite sides. These dimples 32 within each row are preferably uniformly vertically spaced apart at relatively small increments, such as vertical spacings of about one inch, to permit the individual shelves to be vertically positioned at the desired elevations. While the dimples 32 are preferably formed merely by effecting a suitable deformation of the sidewall of the tube so that the dimple hence comprises only a shallow recess, nevertheless it will be appreciated that the dimples could be replaced by holes which penetrate the tube wall if desired. However, use of dimples is preferred.

Considering now the corner connector 13, and specifically the strap 16, same has a substantially tubular or channellike cross section defined by substantially parallel platelike sidewalls 41 joined together at one end by a substantially semicylindrical bight 42 which is rounded outwardly and has an inner clamping surface 43 which has a diameter substantially corresponding to the outer diameter of the post 12. The strap 16 has a pair of projections 44 associated with each side thereof. The projections 44 of each pair are vertically spaced apart by the same spacing (preferably one inch) which separates the dimples 32, and these projections 44 project inwardly from the inner surface of the strap and are located substantially at the point where the planar side surfaces 41 tangentially merge with the semicylindrical bight 42. The pairs of projections 44 are hence disposed substantially diametrically opposite one another at opposite ends of the bight 42 and are spaced approximately 180° apart so as to correspond with the dimples 32 on the post. These projections 44 are formed in conformance with the dimples 32 by being deformed inwardly from the platelike material defining the strap 16.

Each sidewall 41 of the strap 16 also has a pair of elongated ribs 46 and 47 projecting outwardly from the outer surface thereof. These ribs 46 and 47 are vertically spaced apart and are elongated horizontally in substantially parallel relationship. The ribs 46 and 47 are preferably formed by suitably deforming the platelike material defining the strap, and the lower rib 47 preferably projects outwardly through a slightly greater extent than the upper rib 46.

Strap 16 also has a rear wall 48 which extends substantially perpendicularly between the sidewalls 41 at the ends thereof opposite the bight 42. This rear wall 48 is substantially planar but extends at a slight angle relative to the vertical so as to slope inwardly as it extends downwardly. This rear wall extends at an angle in the range of 2° to 8°, and preferably 4° to 6°, relative to the vertical. This rear wall, due to its slope, hence defines thereon an inner cam or wedge surface 49. The lower edge of this rear wall 48 is preferably provided with an integral tab structure 51 which projects horizontally rearwardly.

Figure 10:
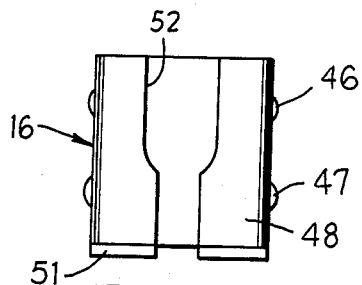
FIG. 10 illustrates a rear elevational view of the strap as taken substantially in the direction of the arrow X as appearing in FIG. 5.
Figure 11:
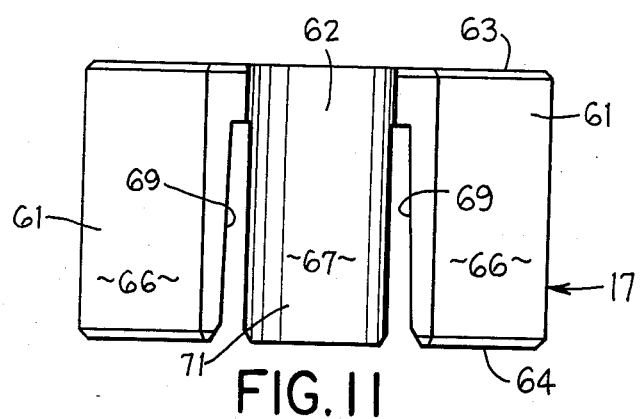
FIG. 11 is a front view of the corner piece as taken substantially in the direction of the arrow XI in FIG. 5.

In the illustrated embodiment, the rear wall 48 of strap 16 is vertically split by means of a central slot 52 extending vertically therethrough, which slot 52 hence results in the rear wall 48 being defined by a pair of spaced wall portions which are integrally bent inwardly from the opposed sidewalls 41. This slot 52, as illustrated by FIG. 10, is of increased width over approximately the upper one-half thereof to provide appropriate clearance for the corner piece 17 and its attachment to the shelf bracket 27, as explained hereinafter.

The strap 16 is preferably formed from relatively thin steel plate, whereupon the desired configuration can be initially stamped from the plate and then suitably deformed so as to permit formation of the strap.

The other clamping member forming the corner connector 13, namely the corner piece 17, includes a pair of side parts 61 joined together by a center part 62. The corner piece includes substantially parallel top and bottom walls 63 and 64, respectively, which are joined together by a pair of sidewalls 66 extending substantially perpendicularly therebetween, which sidewalls 66 also extend in substantially perpendicular relationship to one another. The center part 62 defines thereon a front vertical surface 67 which is concave and of a substantially semicylindrical cross-sectional configuration. This semicylindrical front surface 67 extends vertically throughout the complete height of the corner piece and hence defines a substantially semicylindrical recess 68 which is hence disposed between the side parts 61 and opens outwardly. This semicylindrical surface 67 has a diameter which substantially corresponds to the outside diameter of the post 12 so as to accommodate the post within the recess.

Corner piece 17 has a pair of substantially parallel slots 69 extending vertically upwardly from the bottom wall 64 thereof. These slots 69 project vertically upwardly but terminate substantially short of the top wall 63, so that the slots hence extend upwardly through approximately three-fourths the height of the corner piece. These slots 69 are of narrow width so as to snugly accommodate therein the side plates 41 associated with the strap 16, as described hereinafter. The slots 69 are disposed on opposite sides of the center part 62 substantially at the interface between the side surfaces 66 and the semicylindrical surface 67, whereby these slots hence extend parallel to the longitudinal axis of the semicylindrical recess 68. These slots 69 may be slightly tapered so as to be of a slightly increasing width as they open downwardly.

The presence of the slots 69 results in the center part 62 defining thereon a downwardly cantilevered tongue 71, which tongue in effect functions as a blocklike wedge having the semicylindrical surface 67 formed on the outer or front face thereof. This tongue or wedge 71 has a substantially planar rear surface 72 which slopes outwardly at a small angle relative to the vertical as the surface 72 projects downwardly. This surface 72 extends substantially at the same angle relative to the vertical as does the wedge surface 49 on the strap 16.

Figure 12:
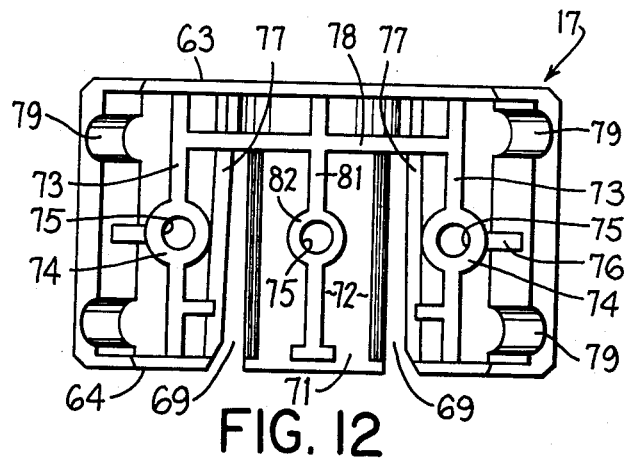
FIG. 12 illustrates the back side of the corner piece as shown in FIG. 11.

The corner piece 17 is of an integral one-piece structure formed preferably by molding same from a high strength engineering plastics material. While the corner piece hence could be substantially solid, nevertheless it is preferred that the corner piece be relatively hollow so as to minimize material and hence cost. For this reason, the interior of the corner piece 17 is provided with a series of interior reinforcing ribs which are most clearly illustrated by FIG. 12. Specifically, each of the side parts 61 has a reinforcing rib 73 which extends vertically between the top and bottom surfaces, which rib 73 has a boss 74 located centrally therealong and defining therein an opening 75. A reinforcing rib 76 extends from the boss 74 sidewardly for connection to the sidewall of the respective side part. A further rib 77 extends vertically of each side part between the upper and lower surfaces, which rib 77 extends directly along the respectively adjacent slot 69 and is also reinforcingly joined to the respectively adjacent boss 74. A horizontal reinforcing rib 78 extends transversely between the vertical ribs 73, which horizontal rib 78 is located directly adjacent the upper ends of the slots 69.

The cantilevered tongue or wedge 71 also preferably has a vertical rib 81 which extends longitudinally thereof and projects rearwardly from the wedge surface 72. This latter reinforcing rib 81 also has a central boss 82 defining therein a further opening 75. These three openings 75 are horizontally spaced apart and positioned for direct alignment with the holes 29 formed in the shelf bracket 27.

The rearward surfaces of the ribs 73, 78 and 81 are preferably spaced slightly inwardly from the rearward edges of the top and bottom walls by a distance which approximately corresponds to the thickness of the shelf bracket 27 so that the shelf bracket 27 will hence be effectively recessed within the rear of the corner piece when the corner piece and bracket are secured together.

While the assembly of the shelving unit 10 according to this invention is believed apparent from the above description, nevertheless same will be briefly described to ensure a complete understanding thereof.

The individual shelves 11 are initially assembled by securing one of the corner pieces 17 to each of the corner brackets 27. This is accomplished by positioning the appropriate corner piece 17 adjacent the respective shelf bracket 27 so that the latter is effectively positioned within the shallow recess formed in the rear of the corner piece, whereupon the corner bracket 27 effectively abuts against the rear surfaces of the ribs formed on the corner piece. When so positioned, the projecting end portions of the truss wires 23-24 are accommodated by the recesses 79 formed in the internal surfaces of the corner piece sidewalls. Suitable threaded fasteners such as screws 91 are then extended through the bracket holes 29 into the openings 75 so as to fixedly attach the corner piece 17 to the respective shelf bracket 27.

The strap 16 is initially positioned on and secured to a respective post 12. The strap is initially slipped over the free end of the post by inserting the post through the strap in the vicinity adjacent the rear wall 48. When the post is positioned adjacent the rear wall, the strap can be easily slidably displaced longitudinally along the post until reaching the desired position. The strap 16 is then sidewardly displaced relative to the post so as to cause the post to be moved into engagement with the bight 42. As the strap is sidewardly moved relative to the post, the pairs of projections 44 on the strap will engage pairs of dimples 32 as formed on opposite sides of the post to effect a securement of the strap to the post. Since the strap has a split extending through the rear wall thereof, this hence provides the strap with sufficient resiliency such that the projections 44 will hence effectively resiliently snap into the dimples 32 so that the strap will hence remain stationarily supported on the post without requiring that it be separately supported or held. The post having the strap mounted thereon is then positioned adjacent the corner piece on the shelf so that the wedge 71 of the corner piece is disposed in engagement with the post directly above the wedgelike cavity defined between the strap and the post. The shelf and post are then relatively moved toward one another, which results in the post sliding longitudinally upwardly along the semicylindrical surface 67 on the wedge until the wedge 71 projects downwardly into the strap and effects a secure wedging engagement between the opposed wedge surfaces 49 and 72. As the wedge 71 moves downwardly into the strap, the wedge surface 72 engages the opposed wedge surface 49 whereupon an outward force is exerted against the wedge surface 49 tending to pull the strap and specifically the bight 42 thereof tightly into engagement with the wall of the post over one-half the peripheral extent thereof. Simultaneously an inwardly directed force is imposed against the wedge surface 72 which hence pushes the wedge 71 and specifically the semicylindrical surface 67 thereof tightly against the other half of the peripheral surface of the post. This hence results in the post being tightly clampingly held between the surfaces 67 and 43. Due to the shallow or small angle of the wedge surfaces 49 and 72, the wedge 71 remains securely locked between the strap and the post while at the same time creating a high compressive and hence clamping force on the post due to the opposed engagement thereof by the wedge 71 and bight 42.

Figure 9:
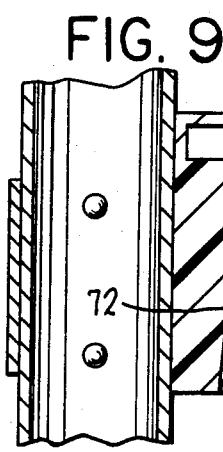
FIG. 9 is a fragmentary sectional view taken substantially along line IX—IX in FIG. 6.
Figure 8:
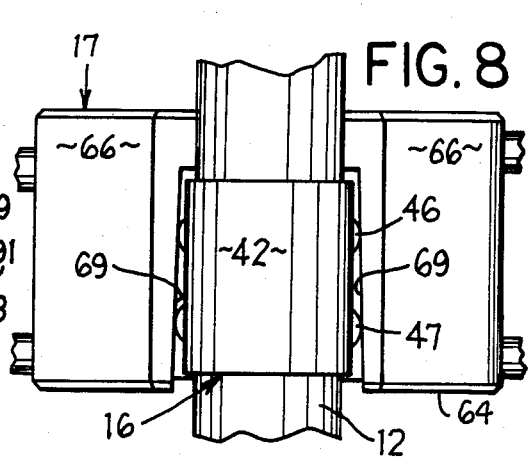
FIG. 8 is an outside view, as taken substantially in the direction of the arrow VIII in FIG. 6, illustrating the corner unit assembled between the post and shelf.

When the corner structure is assembled as described above, the corner piece 17 effectively totally encloses the strap sidewalls 41 and rear wall 48, and the bight 42 is snugly held against the post and merges through the narrow slots 69 into the interior of the corner piece 17. Hence, the corner connector 13 thus possesses minimal cracks or regions which would permit collection of contaminants. Further, the tabs 51 associated with the lower end of the strap rear wall also effectively cooperate with the bottom wall of the corner piece to effectively close off this bottom wall, substantially as illustrated by FIG. 9.

If desired, a shelf 11 can be moved from the assembly 10 by moving the shelf upwardly to effect disengagement of the corner pieces 17 from the straps 16. This thus permits an intermediate shelf to be removed without requiring removal or disassembly of any other parts of the shelf assembly 10. The straps 16 can be permitted to remain on the posts without interfering with usage of the remaining shelf assembly.

While the corner piece 17 has been illustrated and described as being constructed of an integral one-piece structure molded from a plastics material, it will be appreciated that this corner piece could be constructed of other materials, or could be of multiple pieces. For example, the wedge could be of metal and fixedly secured to the shelf bracket, as by welding, with the wedge being covered by a separate plastic cover, whereby the separate plastic cover and the wedge would hence possess the same structural and functional relationships as that possessed by the corner member 17 described above.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a shelving unit having at least one upright post, at least one shelf, and a corner structure coacting between said post and said shelf for stationarily securing said shelf to said post at a selected location, comprising the improvement wherein:

said corner structure includes first and second post-clamping clamping members for clampingly engaging the post therebetween;

said first post-clamping member being separable from said post and having an opening therethrough for accommodating said post, said first post-clamping member being disposed in surrounding relationship to said post and movable relative thereto in the longitudinal direction of said post;

said first post-clamping member having a first clamping part disposed to clampingly and stationarily engage a first peripheral side area of said post, and a pair of side plates which are joined to opposite end of said first clamping part and project away therefrom in straddling relationship to said post;

said second post-clamping member having a second clamping part which is clampingly positioned between said post and said first clamping member so as to be disposed in clamping and stationary engagement with a second peripheral side area of said post which is located on the opposite side of the post from said first peripheral side area; and said first and second post-clamping members having wedging means coacting therebetween in response to insertion of said second clamping part into said first post-clamping member for causing said first and second clamping parts to be wedgingly moved toward one another to clamp said post therebetween;

said second post-clamping member including a main body having a top portion and a pair of downwardly projecting side portions disposed in sidewardly spaced relation, said second clamping part being fixed to said top portion and projecting downwardly therefrom in cantilevered relationship for disposition between said side portions, said side portions being spaced from said second clamping part by narrow slots therebetween which open upwardly through the bottom of said body and terminate at said top portion, and said side plates on said first post-clamping member being closely accommodated within said slots.

2. A shelving unit according to claim 1, wherein said first post-clamping member comprises a substantially closed looplike member having said opening extending therethrough, said opening being elongated in a direction which extends substantially perpendicularly with respect to the longitudinal direction of said post, said looplike member being defined at one end thereof by said first clamping part, said first clamping part being of a generally U-shaped configuration for snugly embracing the post when the post is disposed within said one end of said opening, said first post-clamping member including a second part which substantially defines the other end of said looplike member and is also of a substantially channel-shaped cross section, said second part including a wedge surface which is spaced from the post when the post is positioned in said one end of said opening for defining a wedge-receiving space between said post and said wedge surface, said wedge surface extending at a small angle relative to the longitudinal direction of the post so that said wedge surface slopes inwardly toward the post as it projects downwardly, and said second clamping part being positionable within said wedge-receiving space and having thereon a second wedge surface which slidably engages said first wedge surface to wedgingly and clampingly hold said post between said first and second clamping parts.

3. A shelf unit according to claim 2, wherein said post has uniformly spaced recesses formed in the opposed sidewalls thereof and disposed in uniformly spaced relationship therealong, and wherein said first post-clamping member has projections disposed on opposite sides thereof and projecting inwardly in opposed relationship for engagement with the recesses of said post to stationarily position said first post-clamping member relative to said post.

4. A shelving unit according to claim 3, wherein said first post-clamping member has a slot extending longitudinally through said first wedge surface, said side plates being planar and extending between said first wedge surface and said first part, said planar side plates being resiliently deflectable to permit said projections to resiliently snap into the recesses of said post.

5. A shelf unit according to claim 4, wherein said shelf has a platelike corner bracket fixedly associated therewith and projecting downwardly from said shelf, said corner bracket being positionable so as to abuttingly bear against the rear of said main body, and a plurality of threaded fasteners extending through said corner bracket and fixedly connected to said second post-clamping member.

6. A shelving unit according to claim 5, wherein there are three said threaded fasteners for securing said corner bracket to said second post-clamping member, one of said fasteners extending through said shelf bracket into each of said side portions, and another of said threaded fasteners extending through said shelf bracket into said second clamping part.

7. A shelf unit according to claim 6, said post comprises a tube of substantially circular cross section, said first part being of a substantially semicylindrical cross section for clamping engagement with said post over approximately 180° of the external periphery thereof, said second clamping part having a front concave surface which is of a substantially semicylindrical configuration for clamping engagement with the external periphery of the post over approximately the other one-half of the cylindrical periphery thereof, said second clamping part having a rear surface which is directed outwardly away from the post and defines said second wedge surface.

8. A shelving unit having a plurality of upright posts, a plurality of vertically spaced shelves, and a plurality of corner structures coacting between each said shelf and a respective said post for stationarily securing said shelf relative to said post at a selected vertical location, comprising the improvement wherein:

said corner structure includes a first elongated looplike clamping member positioned in surrounding relationship to a respective said post, said looplike member resembling a strap and being formed as an integral one-piece member from a thin platelike metal, said looplike member defining therein an opening which is elongated in a direction transverse with respect to the longitudinal direction of said post;

said looplike clamping member having a channellike clamping part formed at one end thereof and a channellike wedging part formed at the other end thereof and disposed in opposed relationship to said clamping part, said post being positionable within said clamping part so as to be engaged thereby, said wedging part projecting outwardly from said post on the side thereof opposite from said clamping part so as to define a wedge-receiving space between said wedging part and said post, said wedging part of said first clamping member including a rear wall which is spaced from the post and extends at a slight angle relative to the longitudinal direction of the post, said wedging part also including a pair of spaced side plates which joint to opposite sides of said rear wall and project forwardly therefrom so as to sidewardly embrace opposite sides of said post, said side plates being joined to said channel-shaped clamping part so as to surround said post;

said corner structure including a second clamping member which is stationarily secured to one corner of said shelf and is stationarily engageable with said first clamping member for effecting clamping engagement of said post directly between said first and second clamping members, said second clamping member integrally formed in one piece of a plastics material;

said second clamping member including a body part which is stationarily secured to said shelf and projects-outwardly so as vertically overlie said wedging part of said first clamping member, said second clamping member having a blocklike clamping wedge which is fixed to and projects downwardly in cantilevered fashion from said body part for snug disposition within said wedge-receiving space, said clamping wedge having a front clamping surface which directly clampingly engages the periphery of said post on the side thereof opposite from said clamping part, said clamping wedge also having a rearwardly directed wedge surface which directly wedgingly engages the rear wall of the wedging part of said first clamping member.

9. A shelving unit according to claim 8, wherein the upright post is of substantially circular cross section and has recesses formed therein at selected longitudinally spaced intervals, said recesses being disposed on at least diametrically opposite sides of said post, said clamping part being generally U-shaped and defining a slotlike opening having a width which approximately equals the diameter of said post, said clamping part having an inner clamping surface extending through approximately 180° so as to clampingly and stationarily engage a first peripheral side area of the post, said first clamping member having opposed projections fixedly associated therewith and projecting inwardly from an inner surface thereof for engagement with the recesses associated with said post, said projections being disposed substantially directly opposite one another and projecting inwardly from the inner surfaces of said side plates in the vicinity where said side plates integrally merge with said clamping part, permit said projections to snap into said recesses.

10. A shelving unit having a plurality of upright posts, a plurality of vertically spaced shelves, and a plurality of corner structures coacting between each said shelf and a respective said post for stationarily securing said shelf relative to said post at a selected vertical location, comprising the improvement wherein:

said corner structure includes a first elongated looplike clamping member positioned in surrounding relationship to a respective said post, said looplike member defining therein an opening which is elongated in a direction transverse with respect to the longitudinal direction of said post;

said looplike clamping menber having a channellike clamping part formed at one end thereof and a channellike wedging part formed at the other end thereof and disposed in opposed relationship to said clamping part, said post being positionable within said clamping part so as to be engaged thereby, said wedging part projecting outwardly from said post on the side thereof opposite from said clamping part so as to define a wedge-receiving space between said wedging part and said post, said wedging part of said first clamping member including a rear wall which is spaced from the post and extends at a slight angle relative to the longitudinal direction of the post, said wedging part also including a pair of spaced side plates which joint to opposite sides of said rear wall and project forwardly therefrom so as to sidewardly rear wall and project forwardly therefrom so as to sidewardly embrace opposite sides of said post, said side plates being joined to said channel-shaped clamping part so as to surround said post;

said corner structure including a second clamping member which is stationarily secured to one corner of said shelf and is stationarily engageable with said first clamping member for effecting clamping engagement of said post directly between said first and second clamping members;

said second clamping member including a body part which is stationarily secured to said shelf and projects outwardly so as to vertically overlie said wedging part of said first clamping member, said second clamping member having a blocklike clamping wedge which is fixed to and projects downwardly in cantilevered fashion from said body part for snug disposition within said wedge-receiving space, said clamping wedge having a front clamping surface which directly clampingly engages the periphery of said post on the side thereof opposite from said clamping part, said clamping wedge also having a rearwardly directed wedge surface which directly wedgingly engages the rear wall of the wedging part of said first clamping member;

said second clamping member having a pair of side parts which are fixedly connected to said body part and are disposed on opposite sides of said clamping wedge, said side parts being sidewardly spaced from said clamping wedge by narrow slots therebetween which open upwardly from the bottom of said body part and terminate short of the top wall thereof, the side plates on said first clamping member being closely confined within said slots.

11. A shelving unit according to claim 10, wherein said first clamping member has a looplike configuration resembling a strap and is formed as an integral one-piece member from a thin platelike metal, and wherein said second clamping member is integrally formed in one piece of a plastics material.

12. A shelving unit according to claim 11, wherein said shelf has a platelike corner bracket fixedly associated with each corner thereof, and a plurality of threaded fasteners extending through said corner bracket and into said second clamping member for fixedly securing the latter to said bracket.

* * * * *